US012749691B2

(12) United States Patent
Holmberg

(10) Patent No.: US 12,749,691 B2
(45) Date of Patent: Sep. 29, 2026

(54) FUEL CELL ASSEMBLY

(71) Applicants: POWERCELL SWEDEN AB, Gothenburg (SE); Mattias Holmberg, Gothenburg (SE)

(72) Inventor: Mattias Holmberg, Gothenburg (SE)

(73) Assignee: POWERCELL SWEDEN AB, Gothenburg (SE)

( * ) Notice: Subject to any disclaimer, the term of this patent is extended or adjusted under 35 U.S.C. 154(b) by 627 days.

(21) Appl. No.: 18/036,757

(22) PCT Filed: Nov. 16, 2021

(86) PCT No.: PCT/SE2021/051146
§ 371 (c)(1),
(2) Date: May 12, 2023

(87) PCT Pub. No.: WO2022/131990
PCT Pub. Date: Jun. 23, 2022

(65) Prior Publication Data

US 2023/0420701 A1 Dec. 28, 2023

(30) Foreign Application Priority Data

Dec. 18, 2020 (SE) .................................... 2051498-0

(51) Int. Cl.
*H01M 8/0276* (2016.01)
*H01M 8/0247* (2016.01)
(Continued)

(52) U.S. Cl.
CPC ....... *H01M 8/0276* (2013.01); *H01M 8/0247* (2013.01); *H01M 8/0254* (2013.01);
(Continued)

(58) Field of Classification Search
None
See application file for complete search history.

(56) References Cited

U.S. PATENT DOCUMENTS 6,423,439 B1 * 7/2002 Barton ................ H01M 8/2483 429/514
7,531,265 B2 * 5/2009 Sugiura ............... H01M 8/0234 429/434
(Continued)

FOREIGN PATENT DOCUMENTS

JP 2002270202 A 9/2002
JP 2004214019 A 7/2004
(Continued)

OTHER PUBLICATIONS

Machine translation of JP-2005251676-A (Year: 2005).*
(Continued)

*Primary Examiner* — Gregg Cantelmo
(74) *Attorney, Agent, or Firm* — Muncy, Geissler, Olds & Lowe, P.C.; Mark E. Olds

(57) ABSTRACT

A fuel cell assembly includes first and second flow field plates sandwiching a multilayer membrane electrode assembly having first and second electrodes and a membrane. Each flow field plate has a flow field structure protruding from a base level for distributing reactant. A sealing element between the plates prevents leakage of reactants. In a boundary area between the flow field structure and the sealing element, the first flow field plate has a first bypass stopping element with a pointed portion, and the second flow field plate has a second bypass stopping element with a blunt portion. The first and second bypass stopping elements are arranged opposite each other to form a bypass stopping element assembly, wherein the blunt portion is adapted to be indented by the pointed portion, which compresses the multilayer membrane electrode assembly to avoid reactant bypassing the flow field structure.

12 Claims, 6 Drawing Sheets

(51) Int. Cl.

| | |
|---|---|
| ***H01M 8/0254*** | (2016.01) |
| ***H01M 8/0267*** | (2016.01) |
| ***H01M 8/0273*** | (2016.01) |
| ***H01M 8/242*** | (2016.01) |

(52) U.S. Cl.

CPC ....... *H01M 8/0267* (2013.01); *H01M 8/0273* (2013.01); *H01M 8/242* (2013.01)

(56) References Cited

U.S. PATENT DOCUMENTS

| | | | |
|---|---|---|---|
| 10,153,499 | B2 | 12/2018 | Xu et al. |
| 2005/0089745 | A1 | 4/2005 | Sugita et al. |
| 2005/0255362 | A1 | 11/2005 | Miyazawa |
| 2007/0298310 | A1 | 12/2007 | Kato |
| 2009/0130519 | A1 | 5/2009 | Sato et al. |
| 2013/0241158 | A1 | 9/2013 | Koga et al. |
| 2017/0141413 | A1 | 5/2017 | Poirot-Crouvezier |
| 2018/0048012 | A1 | 2/2018 | Beutel et al. |
| 2019/0097246 | A1 | 3/2019 | Poirot-Crouvezier |
| 2019/0181460 | A1 | 6/2019 | Poirot-Crouvezier et al. |
| 2019/0221866 | A1 | 7/2019 | Gambini |

FOREIGN PATENT DOCUMENTS

| | | | | |
|---|---|---|---|---|
| JP | 2005251676 | A | * | 9/2005 |
| JP | 2008-4478 | A | | 1/2008 |
| JP | 2013069541 | A | | 4/2013 |
| JP | 2015170398 | A | | 9/2015 |
| JP | 2018073623 | A | * | 5/2018 |

OTHER PUBLICATIONS

Machine translation of JP-2018073623-A (Year: 2018).*

International Search Report (Mar. 4, 2022) for corresponding International App. PCT/SE2021/051146.

Swedish Search Report (Aug. 19, 2021) for corresponding Swedish App. 2051498-0.

Korean Official Action (May 21, 2025) for corresponding Korean App. 10-2023-7020271.

CN Office action issued Sep. 26, 2025 in corresponding CN application 202180077806.9 and partial translation.

CA Office action issued Oct. 7, 2025 in corresponding CA application 3,199,920.

Japanese Official Action (Sep. 2, 2024) for corresponding Japanese App. 2023-537909.

* cited by examiner 73-2
71

2;4
70
73-1
63-2
24;46
61
60

631
66
77

FUEL CELL ASSEMBLY

BACKGROUND AND SUMMARY

The present invention relates to a fuel cell assembly, comprising at least a first flow field plate, a second flow field plate and a multilayer membrane electrode assembly. Such a fuel cell assembly is often referred to as unit fuel cell.

Usually, a fuel cell stack comprises a plurality of membrane electrode assemblies (MEAs), which are sandwiched by so called bipolar plates (BPP). The bipolar plates in turn are a combination of the above mentioned first flow field plate and the second flow field plate, and are usually made from an electrically conducting material, such as metal or graphite. Typically, the flow field plates have a flow field for the reactants at one side and a flow field for a cooling fluid on the other side. Thereby, the cooling fluid flow fields are facing each other, whereas the reactant fluid flow fields face the membrane electrode assemblies. However, also other designs, particularly with a third intermediate layer providing the cooling flow field, are also known. The electric current produced by the membrane electrode assemblies during operation of the fuel cell stack results in a voltage potential difference between the bipolar plate assemblies, and is strongly dependent on a uniform distribution of the reactants over the surface of the electrodes. Consequently, it is desired to distribute the reactant over the whole surface of the electrodes for achieving the highest electric current output.

Disadvantageously, the flow field of the flow field plates also constitutes a flow resistance for the reactant, so the reactant tends to bypass the flow field at the edges of the flow field plate (boundary region).

In the state of the art, it has been therefore suggested to provide bypass stopping elements in the boundary area between the flow field and a so called bead seal, which is adapted to provide a sealing of the unit fuel cell to an environment.

However, it has turned out that due to stacking imperfections the sealing contact between the bypass stopping elements and the adjacent multilayer membrane electrode assembly or the adjacent other flow field plate, respectively, may become insufficient.

It is therefore desirable to provide an improved bypass stopping element, which is reliably avoiding bypass of the reactant fluids of the flow field.

In the following a fuel cell assembly comprising at least a first flow field plate and a second flow field plate sandwiching a multilayer membrane electrode assembly is provided. Such a fuel cell assembly may also be referred to as unit fuel cell. The flow field plates themselves are usually placed back to back and thereby provide a so-called bipolar plate. Further, the multilayer membrane electrode assembly comprises at least one first electrode facing the first flow field plate, a second electrode facing the second flow field plate and a membrane separating the electrodes. Each flow field plate has a flow field structure protruding from a base level of the flow field plate for distributing reactant over an active area, defined by the respective electrode. Additionally, at the electrode facing front side at least one sealing element is arranged between the first and the second flow field plate, which is adapted to prevent leakage of the reactants to an environment, and in a boundary area between the flow field structure and the sealing element of at least one of the flow field plates at least one bypass stopping element is arranged for avoiding the reactant bypassing the flow field structure, wherein the bypass stopping element protrudes from the respective base level of the flow field plate.

For avoiding a bypass of the reactants even if stacking imperfections impact the sealing between the bypass stopping elements and the sandwiched membrane electrode assembly, it is suggested that the at least one bypass stopping element has a pointed portion which is adapted to compress the multilayer membrane electrode assembly. A pointed portion in accordance with this application is an area of the bypass stopping element, where at last a part of the surface interacting with the membrane electrode assembly is made as small as possible. Thereby, the sealing off function of the bypass stopping elements can be ensured even if a distance between the bypass stopping element and the membrane electrode assembly is slightly increased due to stacking tolerances. The pointed portion thereby increases the pressure in a small and confined area and thereby provides excellent sealing properties.

According to a preferred embodiment, the multilayer membrane electrode assembly further comprises at least one subgasket, wherein the at least one subgasket is adapted to frame the multi-layer membrane electrode assembly, wherein the at least one subgasket is adapted to extend at least partly over the at least one bypass stopping element, so that the pointed portion of the bypass stopping element compresses the at least one subgasket. Thereby it is ensured that the pressure force applied by the pointed portion or the bypass element in general does not damage the electrodes or the membrane of the multi-layer membrane electrode assembly.

According to a further preferred embodiment, the multilayer membrane electrode assembly further comprises at least one gas diffusion layer, which is positioned between the first electrode and the first flow field plate, and preferably a second gas diffusion layer, which is positioned between the second electrode and the second flow field plate, wherein the at least one gas diffusion layer is adapted to extend at least partly over the at least one bypass stopping element, so that the pointed portion of the bypass stopping element compresses the at least one gas diffusion layer.

Usually, the gas diffusion layer provides a certain thickness over a subgasket encompassing and carrying the membrane electrode assembly. Thus, compressing the gas diffusion layer increases the force which is applied by the pointed portion and thereby increase the sealing properties of the bypass stopping element.

It is further preferred that the sealing element is a bead seal surrounding the flow field plate and thereby the flow field structure, wherein the bead seal protrudes from the base level and is adapted to be directly or indirectly in contact the bead seal of the respective other flow field plate for preventing leakage of the reactants to an environment. Bead seals have been proven to provide excellent sealing properties to the environment and are easily manufactured.

According to a further preferred embodiment, the first flow field plate has at least one first bypass stopping element and the second flow field plate has at least one second bypass stopping element, wherein the first bypass stopping element and the second bypass stopping element are arranged opposite to each other, so that the first and second bypass stopping elements form at least one bypass stopping element assembly, wherein the first bypass stopping element has a pointed portion and the second bypass stopping element as a blunt portion, wherein the blunt portion of the second bypass stopping element is adapted to be indented by the pointed portion of the first bypass stopping element. The synergistic effects of the both bypass stopping elements increase the sealing function even further.

Thereby it is advantageous, that, in cross-section, the blunt portion of the second bypass stopping element is wider than the pointed portion of first bypass stopping element. This allows for a certain stacking and alignment tolerance without deteriorating the function of the bypass stopping elements.

In a further advantageous embodiment, the bypass stopping element is a continuous element extending at least along a length of the flow field structure, wherein at least upstream of the flow field structure in direction of the reactant flow, the bypass stopping element is connected to the sealing element. This design allows for a simplified manufacturing. The known bypass stopping elements are discrete elements which have to be separately manufactured, which in turn increases the effort for the manufacture process.

However, it also possible to design the bypass stopping elements as a plurality of discrete bypass stopping elements, preferably a plurality of bypass stopping element assemblies, which are arranged in the boundary area between the flow field structure and the bead seal of at least one of the flow field plates. This allows using already existing manufacturing tools and processes for flow field plates, which has to be modified only slightly.

According to a further preferred embodiment, the first bypass stopping elements having the pointed portion are discrete elements and the second bypass stopping element having the blunt portion is a continuous element extending at least along the length of the flow field structure, or the first bypass stopping elements having the pointed portion is a continuous element extending at least along the length of the flow field structure and the second bypass stopping element having the blunt portion are discrete elements. By designing one of the bypass stopping elements as discrete elements and the other as continuous element, the stacking and aligning tolerances may be increased without deteriorating the sealing function of the bypass stopping element.

The at least one bypass stopping element may be an integral part of the flow field plate, but it is also possible that the bypass stopping element is a separate element from the flow field plate, wherein particularly the bypass stopping element is a frame-like element. In case the bypass stopping element is part of the flow field plate, the bypass stopping element may be manufactured simultaneously with the flow field plate, which accelerates the manufacturing process. The separate element in turn allows for a very flexible arrangement.

Thereby, it is particularly preferred that the at least one bypass stopping element is an integral part of a subgasket or a gas diffusion layer. This reduces the overall number of parts which have to be stacked and thereby reduces any misalignment risks and increases the sealing function of the bypass stopping element.

Since hydrogen, the reactant supplied at the anode is a very small molecule, proper sealing of the anodes side is particularly difficult. Therefore, it is preferred that the bypass stopping element with the pointed portion is arranged at least at the anode side. By the increased local compressive pressure of the pointed portion, the sealing function of the bypass stopping element is increased.

A further aspect of the present invention relates to a flow field plate, particularly an anode flow field plate, for a fuel cell assembly as mentioned above, wherein the flow field plate has at least one bypass stopping element with pointed portion which is adapted to compress the multilayer membrane electrode assembly.

Further preferred embodiments are defined in the dependent claims as well as in the description and the figures. Thereby, elements described or shown in combi-nation with other elements may be present alone or in combination with other elements without departing from the scope of protection.

BRIEF DESCRIPTION OF THE DRAWINGS

In the following, preferred embodiments of the invention are described in relation to the drawings, wherein the drawings are exemplarily only, and are not intended to limit the scope of protection. The scope of protection is defined by the accompanied claims, only.

The figures show.

a: plan view b: cross section

FIG. 2: a schematic illustration of a flow field plate, particularly a cathode flow field plate, for a bipolar plate assembly comprising a flow field plate according to the embodiment shown in FIG. 1;

c: plan view d: cross section

Figures 2A, 2B:
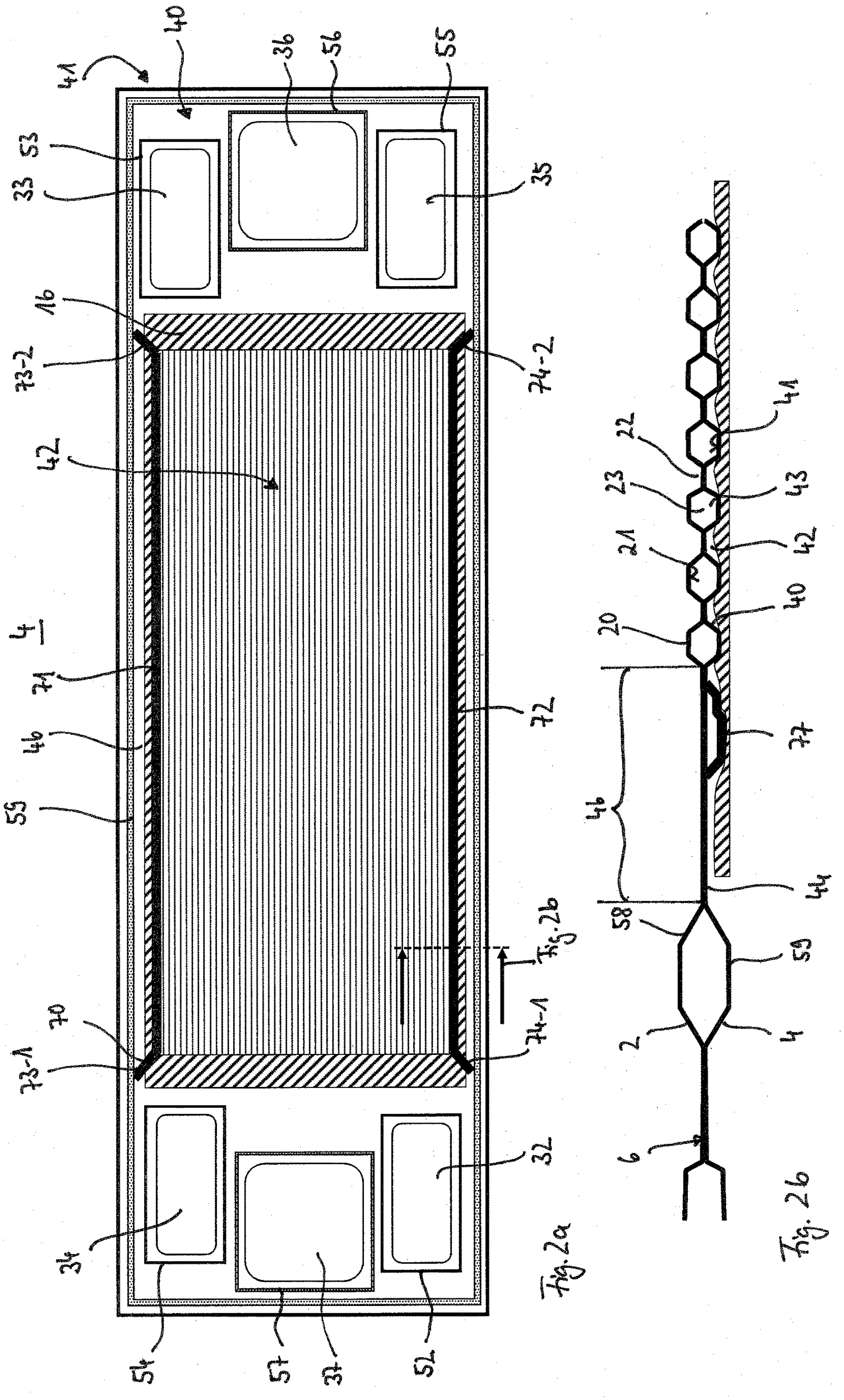
Figure 3:
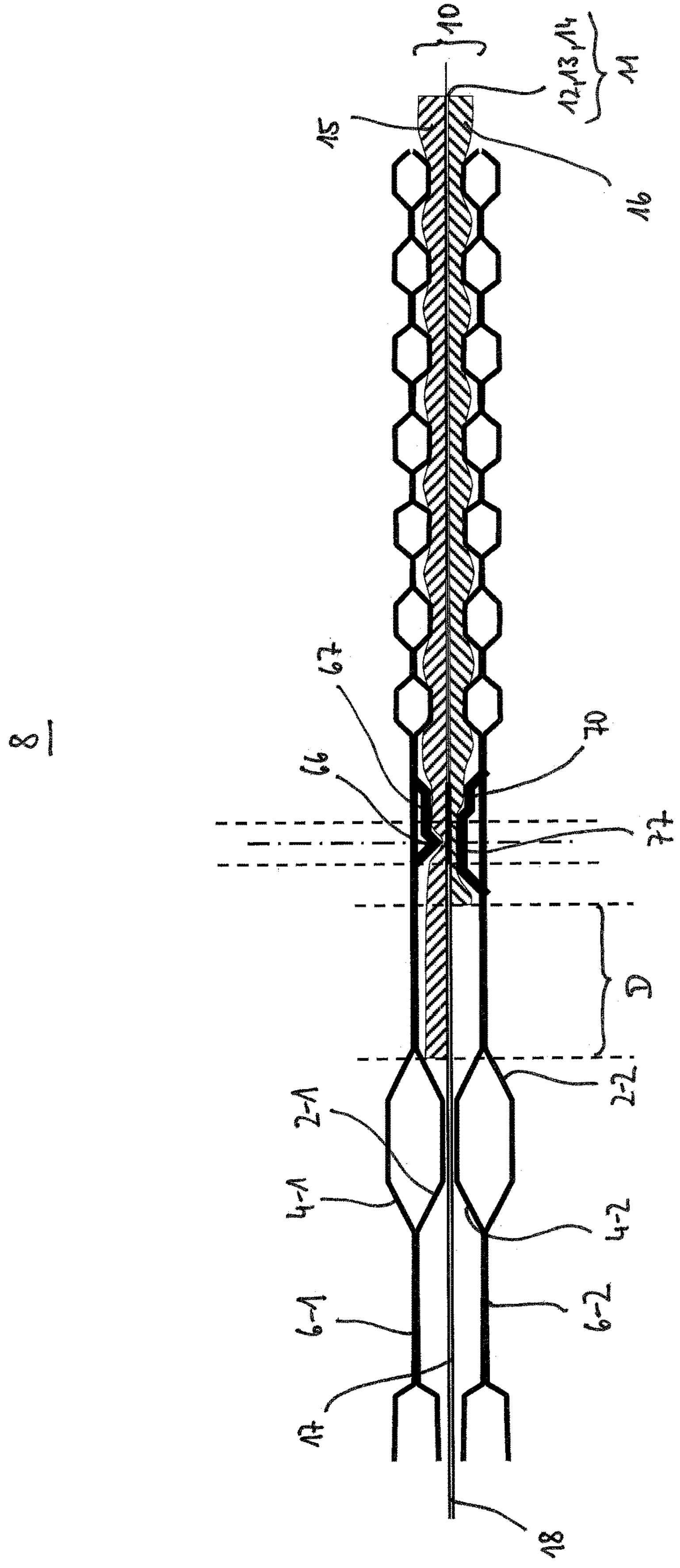
Figure 4:
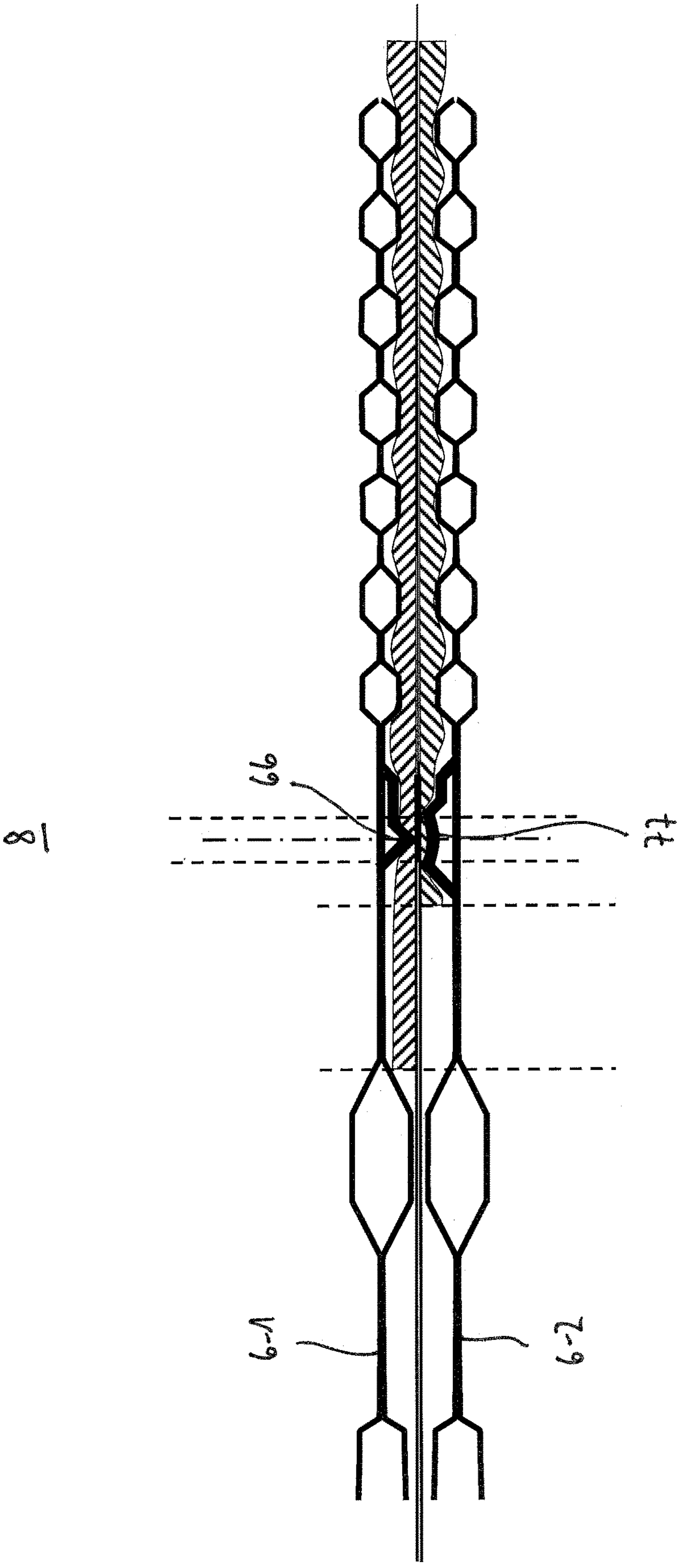
Figure 5A:
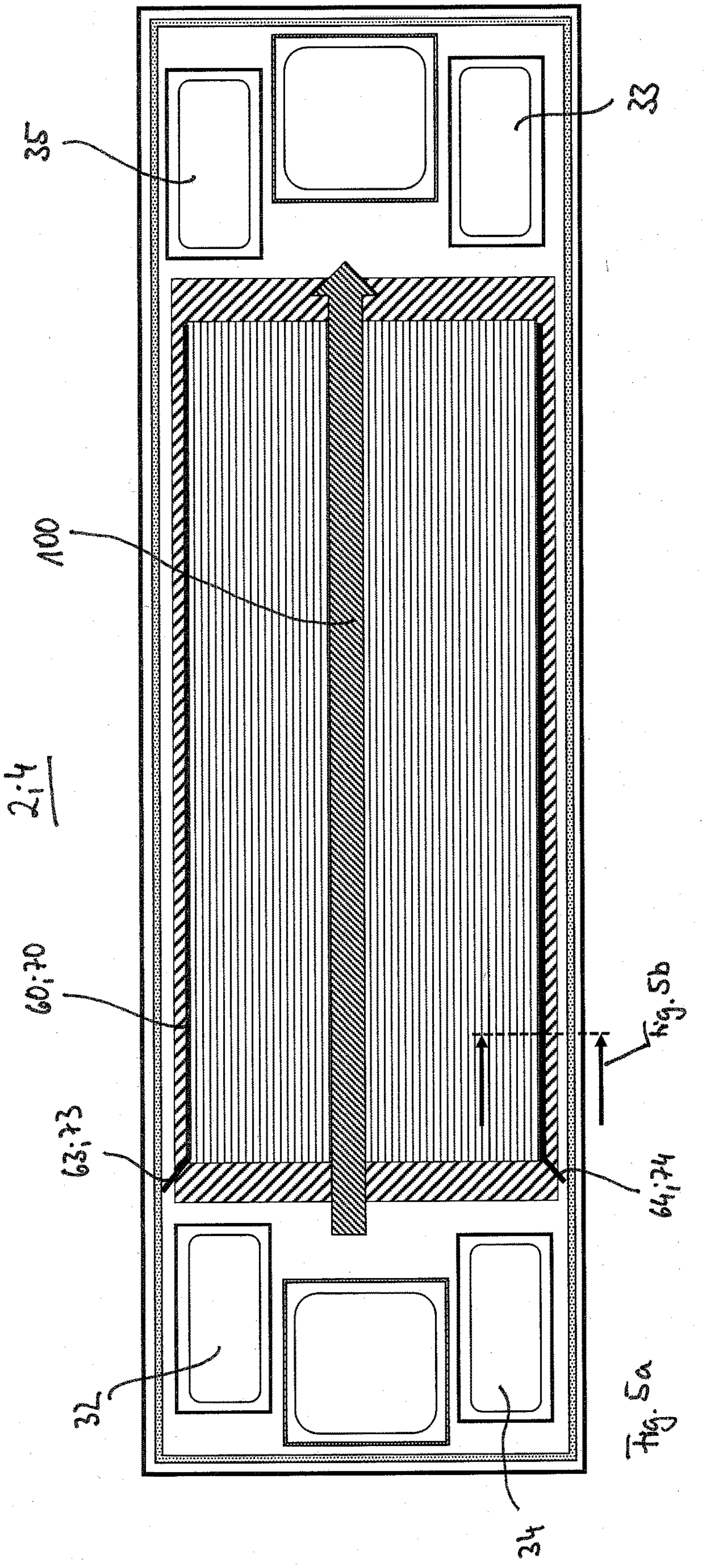
Figure 5B:
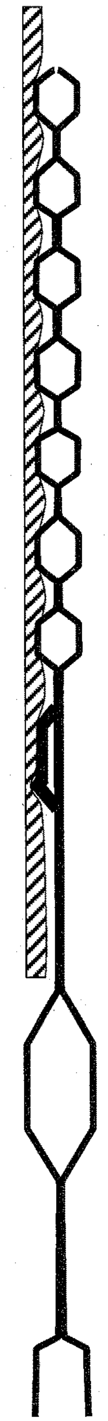

FIG. 3: a schematic cross section through a fuel cell assembly comprising the flow field plates according to the embodiment shown in FIGS. 1 and 2;

FIG. 4: a schematic cross section through a fuel cell assembly according to a second embodiment;

FIG. 5: a schematic illustration of a flow field plate, particularly an anode flow field plate, according to a third preferred embodiment;

a: plan view b: cross section

Figures 6A, 6B, 6C:
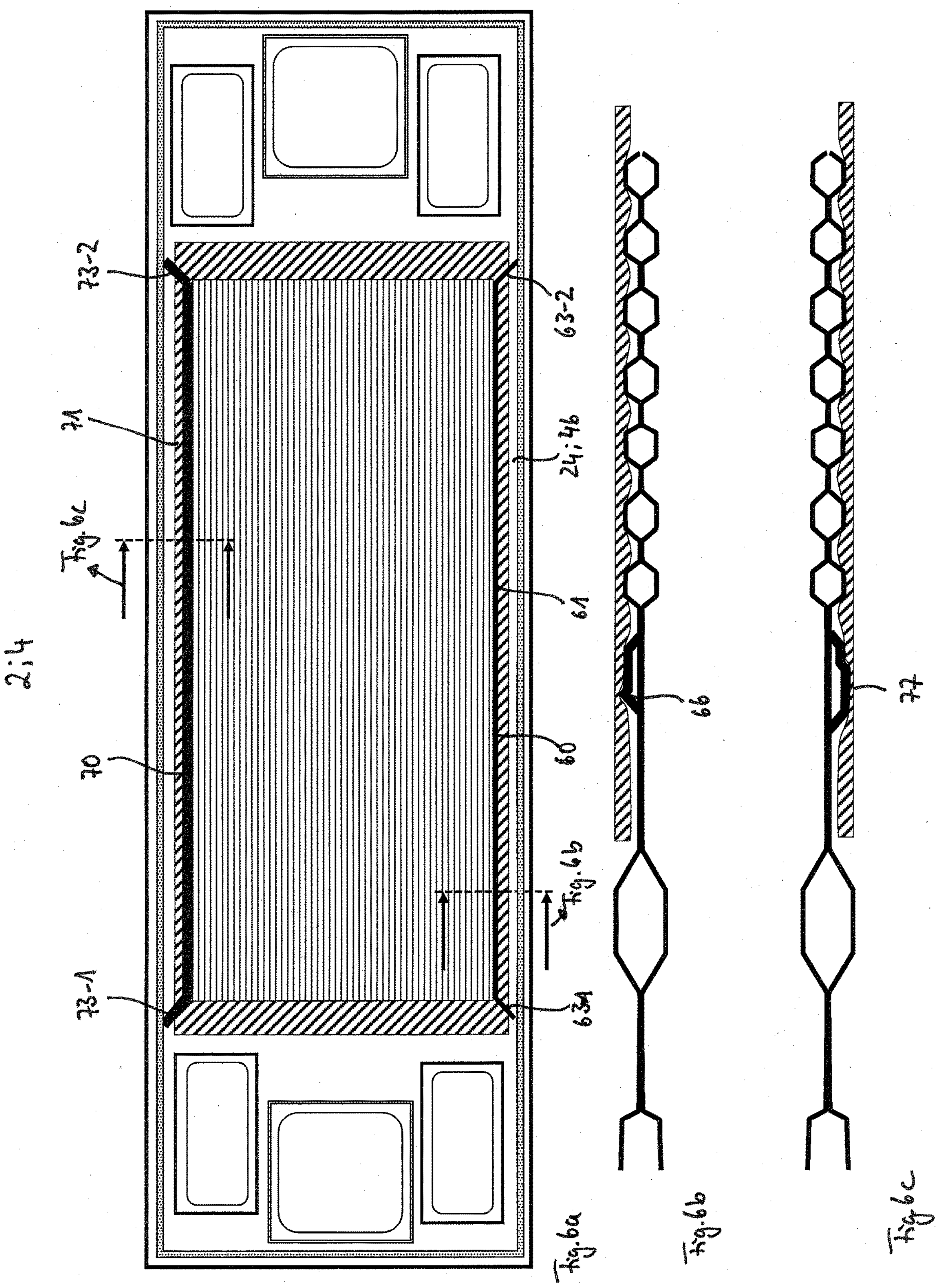

FIG. 6: a schematic illustration of a flow field plate, particularly an anode flow field plate, according to a fourth preferred embodiment;

a: plan view b, c: cross section.

DETAILED DESCRIPTION

In the following same or similar functioning elements are indicated with the same reference numerals. The drawings are schematic, only. Consequently, any distance, size or angle is only schematic and does not illustrate real dimensions.

Figures 1A, 1B:
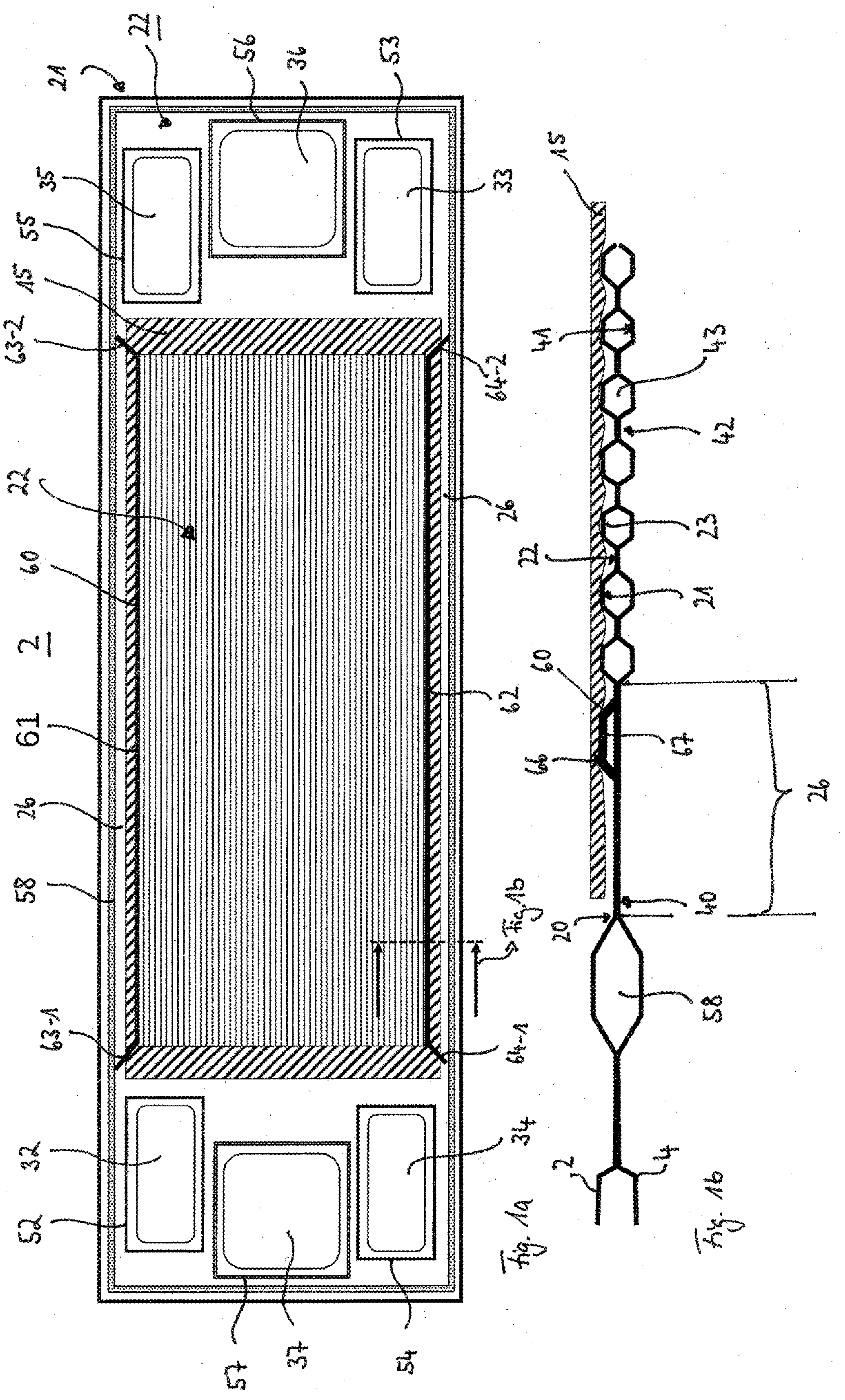
FIG. 1: a schematic illustration of a flow field plate, particularly an anode flow field plate, according to a first preferred embodiment.

FIG. 1, FIG. 2 and FIG. 3 schematically illustrate a first embodiment of a fuel cell assembly 1. Thereby, FIG. 1*a* depicts a schematic plan view of a first flow field plate 2, particularly an anode flow field plate, and FIG. 2*a* depicts a schematic plan view of a second flow field plate 4, particularly cathodes flow field plate. In fuel cell technology, the anode and cathode flow field plates are combined and form so called bipolar plates 6. Accordingly, FIG. 1*b* and FIG. 2*b* illustrate cross section through a bipolar plate 6 comprising the first and second flow field plate 2, 4, wherein FIG. 1*b* illustrates further details of the first (anode) flow field plate 2 and FIG. 2*b* illustrates further details of the second (cathode) flow field plate 4. FIG. 3 depicts a cross section through a fuel cell assembly 8 comprising two bipolar plates 6-1 and 6-2, which sandwich a multilayer membrane electrode assembly 10.

In the illustrated embodiment, each flow field plate 2, 4 has a front side 20, 40 and a back side 21, 41. Both, front side and back side, are equipped with a flow field 22, 23, 42, 43, which define an active area at the flow field plate. The flow fields 22, 42 of the front sides 20, 40 are channel like structures which protrude from a base level 24, 44 of the flow field plates 2, 4 and are adapted to distribute reactant to the respective multilayer membrane electrode assemblies 10 (see FIG. 3). The flow field 23, 43 at the backsides are adapted to guide cooling fluid. As can be seen in FIG. 1*b*, FIG. 2*b* and FIG. 3, due to the back to back arrangement of the flow field plates 2, 4, the channel like structures of the back sides' flow fields 23, 43 are arranged in such a way that closed tubelike channels are formed which are adapted to distribute the cooling fluid evenly over the flow field region.

The multilayer membrane electrode assembly 10 usually comprise a 3-layer basic membrane electrode assembly 11 with an anode 12, a membrane 13 and a cathode 14. For providing a uniform distribution of the reactant to the electrodes, the multilayer membrane electrode assembly 10 further comprises gas diffusion layers 15, 16, which are arranged at the electrodes facing the respective flow field plate 2, 4. As illustrated, the gas diffusion layers 15, 16 are slightly larger than the flow field 22, 42 which ensures a homogenous distribution of the reactants to the flow field over the whole active area, which is defined by the size and extension of the respective electrodes 12, 14. Further, the gas diffusion layers 15, 16 and the 3-layer membrane electrode assembly 11 is framed by a so called subgasket(s) 17, 18, wherein the size and form of the sub-gaskets 17, 18 are adapted to the size and form of the flow field plates 2, 4.

Each flow field plate 2, 4 further comprises a fuel inlet 32, an oxidizing agent inlet 34 and a cooling fluid inlet 36, which are in fluid connection (not illustrated) with the respective flow field 22, 42, 23, 43 for providing and distributing fuel, particularly a hydrogen rich gas, oxidizing agent, particularly air, and cooling fluid, particularly water, to the active area of the bipolar plate.

Analogously, each flow field plate 2, 4 further comprises a fuel outlet 33, an oxidizing agent outlet 35 and a cooling fluid outlet 37, which are in fluid connection (not illustrated) with the respective flow field 22, 4223, 43 for discharge fuel, oxidizing agent, and cooling fluid, from the active area and also from the bipolar plate.

For avoiding unintended mixing of the fluids, each inlet 32, 34, 36 and each outlet 33, 35, 37 is framed by a bead seal 52, 53, 54, 55, 56, 57. Further, the flow field plate as such and the flow field 22, 42, in particular, are sealed by a bead seal 58, 59, which encompasses the whole plate. As illustrated in the cross section views, the bead seal protrudes from the base level 24, 44 and has a height which is higher than the height of the channel-like structures of the flow fields 22, 42; 23, 43. Other sealing means are also applicable.

As mentioned above, the flow field 22, 42 of the flow field plates 2, 4 constitutes a certain flow resistance for the reactant. Thus, the reactant tends to bypass the flow field in a boundary region 26, 46 between the flow field 22, 42 and the bead seal 58, 59. This tendency is supported by the gas diffusion layers 15, 16 overlapping the flow fields 22, 42, as the gas diffusion layers extend into the boundary region and therefore reactant is guided into this region as well.

For avoiding such a bypass, the flow field plates 2, 4 are equipped with bypass stopping elements 60 and 70, respectively, which protrude over the base level 24, 44 of the flow field plates 2, 4. Thereby, a height of the bypass stopping elements 60, 70 may be similar to or even higher than the height of the bead seal 58.

In the first embodiment illustrated in FIGS. 1 to 3, the bypass stopping element of the anode flow field plate (see FIG. 1) comprises two elongated protrusions 61 and 62 which extend along the flow field 22. The elongated protrusions 61, 62 are connected by flow blocking protrusions 63-1, 63-2, 64-1, and 64-2 to the bead seal 58. The flow blocking protrusions ensure that reactant which is guided from the inlet 32 to the flow field 22 cannot enter the boundary region 26. The bypass stopping elements 60, 70 and particularly the elongated protrusions 61, 62 may be continuous elements, but may also be designed as discrete elements.

As illustrated in the cross section of FIG. 1*b*, the bypass stopping element 60 has a pointed portion 66 and a blunt portion 67. Both parts compress the gas diffusion layer 15, but the blunt portion to a much lower extent than the pointed portion 66. Thereby, in this embodiment, the blunt portion 67 compresses the gas diffusion layer in a similar extent as the flow field 22, acting therefore as last landing at the edge of the flow field 22. The pointed portion in fact "over"-compresses the gas diffusion layer 15 so that any bypass of reactant beyond the pointed portion 66 is surely avoided. It should be noted that even if the pointed portion is illustrated as sharp edge, in reality due to manufacturing restrictions, the pointed portion will be a surface area, wherein the surface is made as small as possible and as edged as possible. In the state of the art, the known bypass stopping elements show only the flat part, which cannot apply a sufficient force for a reliable blocking of any bypass. This is particularly necessary for the anodes side as the small molecules of the hydrogen rich gas easily bypass ordinary barriers.

Even if the cathode plate could be also left without bypass stopping element, it is also preferred to block the bypass of the oxidizing agent as well by means of extra bypass stopping elements. Consequently, as illustrated in FIGS. 2 and 3, also the cathode flow field plate 4 is equipped with bypass stopping elements 70, which are in principle analogously designed to the bypass stopping elements 60 of the anode plate 2 and comprise elongated protrusions 71, 72 and flow blocking protrusions 73-1, 73-2, 74-1, and 74-2. The bypass stopping elements 70 as such, and particularly the elongated protrusions 71, 72, may be continuous elements, but may also be designed as discrete elements.

Preferably, the bypass stopping element 60 of the anode plate 2 and the bypass stopping element 70 of the cathode plate 4 are arranged in the same area (see also FIG. 3). Thereby, the combination of the bypass stopping element 60 of the anode plate 2 and the bypass stopping element 70 of the cathode plate 4 increase the compressing forces to the gas diffusion layers 15, 16 in the region of the bypass stopping elements 60, 70. This in turn allows for an improved blocking of any bypass flow.

In contrast to the bypass stopping element 60 of the anode flow field plate 2, the bypass stopping element 70 of the cathode plate 4 has no pointed part, but an extended blunt portion 77 (see FIGS. 2*b* and 3). Thus, as depicted in FIG. 3, the bypass stopping element 70 of the cathode plate 4 is wider than the bypass stopping element 60 of the anode plate 2. This allows for a wide alignment tolerance so that even if the bipolar plates 6-1 and 6-2 (see FIG. 3) are misaligned it can be ensured that the pointed portion 66 of the bypass stopping element 60 interacts with the blunt portion 77 of the bypass stopping element 70 and provides an increased compression force. It goes without saying that the bypass element of the second (cathode) flow field plate 4 may also have a pointed part. However, the misalignment tolerances are quite narrow, then.

Further, it is even possible that the pointed portion 66 of the bypass stopping element 60 deforms, particularly indents, the blunt portion 77 of the cathode bypass stopping element 70, as is illustrated in the second embodiment shown in FIG. 4. Such a design allows for higher compression forces by providing bypass stopping element with a height that extends over the height of the bead seal 58. The excess height is levelled out by the indentation which results in a very high compression of the gas diffusion layer and thereby in an improved bypass flow stopping feature. Thereby, it is preferred that the bypass stopping element 60 is made from a rigid material, wherein the bypass stopping element is either made from a resilient material or flexible enough, e.g. hollow shaped, for allowing the indentation.

FIG. 5 illustrates a further preferred embodiment of flow field plate 2; 4. In contrast to the flow field plates of the embodiments of FIGS. 1-4, the bypass stopping elements 60; 70 only have a single bypass blocking protrusion 63, 73, 64, 74, which is arranged upstream of the flow field in a main flow direction of the reactant (illustrated by arrow 100). In case the flow field plate is always arranged in the same orientation in the stack, a main flow direction of the reactant can be identified. This in turn allows for a simplified design, with only a single bypass blocking protrusion 63, 73, 64, 74 arranged upstream which is sufficient to block the bypass of the reactant. The second bypass blocking protrusion 63-2, 64-3, 73-2, 74-2 as illustrated in FIGS. 1 to 4 in turn allows for a turning of the bipolar plates 6-1, 6-2, e.g. in order to compensate for height differences in the stack, which may occur due to manufacturing inaccuracies.

However, for providing uniform dimensions of the fuel cell stack and also for avoiding different designs for flow field plates for the cathode, anode side, it is preferred to provide a flow field plate which may be used as anode plate and cathode plate, e.g. by simply flipping the plate. For such a case, a preferred design of the flow field plate 2, 4 is preferred which is schematically illustrated in FIG. 6. In this embodiment, the flow field plate comprises two different bypass stopping element, namely bypass stopping element 60 and bypass stopping element 70, which are arranged at the two sides of the flow field 23, 43. Due to the flip of the flow field plates during formation of the bipolar plate 6 and the subsequent stacking, the bypass stopping element 60 with the pointed portion 66 is always paired with the bypass stopping element with the blunt portion 77. Thus, the region with the over-compressed gas diffusion layer can also be provided when only a single design flow field plate is used.

As can be further seen form the illustrated embodiments, a distance D (indicated in FIGS. 3 and 4) between the bead seal 58, 59 and the bypass stopping element 60, 70 is determined to be adapted to the largest possible manufacturing inaccuracies for arranging the gas diffusion layer at the electrodes, which are to be expected. Thereby it is ensured that the bypass stopping elements always over-compress the gas diffusion layer 16, 17 so that a bypass flow of the reactants may be avoided, reliably.

The bypass stopping elements 60, 70 may be integral parts of the flow field plate, but it is also possible that the bypass stopping elements are separate elements which may be arranged between or bonded to the bipolar plate and/or being integral parts of the multilayer membrane electrode assembly 10, e.g. the subgasket 17, 18. It is also possible that parts of the bypass stopping elements are differently designed so that e.g. the elongated protrusion is portion of the membrane electrode assembly and the bypass blocking protrusions are integral parts of the bipolar plate or vice versa.

In the illustrated embodiments, the bypass stopping elements 60, 70 are hollow elements, but it is also possible that at least one bypass stopping element or portion of the bypass stopping element is solid.

Further it is also possible that a portion or the complete bypass stopping element 60, 70 is made from a resilient material. However, it is also possible that the bypass stopping element is non-elastic or in parts be made from elastic and non-elastic materials.

In summary due to the over compression of the gas diffusion layer, alongside the active area, an effective blocking of any bypass flow inside the gas diffusion layer is formed. As a result, the importance of controlling the width and location of the gas diffusion layer is greatly reduced. For providing the necessary compression force, at least one bypass stopping element is provided with a total surface which is as small as possible, particularly a pointed portion. Thereby the pointed portion allows a high gas diffusion layer compression without inflicting on other properties of the fuel cell, such as:

Gas tightness
Electrical resistance
Gas distribution
Mass transport

Further, having a high gas diffusion layer compression element minimizes the cross-sectional void int eh boundary region between the gas diffusion layer edge and gas sealing bead. The gas diffusion layer compression and bypass stopping element could be a part of the flow field plate material regardless of what material is used, such as stainless sheet metal or graphite. The gas diffusion layer compression and bypass stopping element could be made of a different material compared to the flow field plate and then bonded together with it. It could also be none uniform when it comes to material and shape to enable realization and/or the manufacturing process. The compression and bypass stopping element may be made hollow or solid or a combination thereof. Part of or the complete gas diffusion layer compression and bypass stopping element may be made of elastic of non-elastic materials or a combination thereof.

All in all, the proposed bypass stopping element allows for cost savings in manufacturing. The resulting possible increased fuel efficiency also increases value of the fuel cell stack as well as saves money during operation.

REFERENCE NUMERALS

2 first flow field plate
4 second flow field plate
6 bipolar plate
8 Fuel cell assembly
10 multilayer membrane electrode assembly
11 3-layer membrane electrode assembly
12 anode
13 membrane
14 cathode
15, 16 gas diffusion layers
17, 18 sub-gaskets
20; 40 front side of the flow field plate
21; 41 back side of the flow field plate
22; 42 front side flow fields
23; 43 back side flow fields
24; 44 base level

26; 46 boundary region
32 fuel inlet
33 fuel outlet
34 oxidizing agent inlet
35 oxidizing agent outlet
36 cooling fluid inlet
37 cooling fluid outlet
52, 53, 54, 56, 57 bead seals for inlet/outlet
58, 59 Bead seals for plate
60; 70 bypass stopping element
61; 71, 62; 72 elongated protrusions
63; 64, 73,74 blocking protrusions
66 pointed portion
67; 77 blunt portion
100 main flow direction of reactant

The invention claimed is:

1. A fuel cell assembly comprising at least a first flow field plate and a second flow field plate sandwiching a multilayer membrane electrode assembly, wherein the multilayer membrane electrode assembly comprises at least a 3-layer membrane electrode assembly comprising a first electrode facing the first flow field plate, a second electrode facing the second flow field plate and a membrane separating the electrodes, wherein the first flow field plate has a first flow field structure protruding from a first base level of the first flow field plate for distributing reactant over the first electrode, and the second flow field plate has a second flow field structure protruding from a second base level of the second flow field plate for distributing reactant over the second electrode, wherein further at least one sealing element is arranged between the first flow field plate and the second flow field plate, which is adapted to prevent leakage of reactants to an environment, wherein in a boundary area between the first flow field structure and the at least one sealing element, a first bypass stopping element is arranged for avoiding the reactant bypassing the first flow field structure, wherein the first bypass stopping element protrudes from the first base level of the first flow field plate, wherein the first bypass stopping element has a pointed portion, which is adapted to compress the multilayer membrane electrode assembly, and wherein the second flow field plate has a second bypass stopping element, wherein the first bypass stopping element and the second bypass stopping element are arranged opposite to each other, so that the first bypass stopping element and the second bypass stopping element form at least one bypass stopping element assembly, wherein the second bypass stopping element has a blunt portion, and wherein the blunt portion of the second bypass stopping element is adapted to be indented by the pointed portion of the first bypass stopping element.

2. The fuel cell assembly according to claim 1, wherein the multilayer membrane electrode assembly further comprises at least one gas diffusion layer, which is positioned between the first electrode and the first flow field plate, and a second gas diffusion layer, which is positioned between the second electrode and the second flow field plate, wherein the at least one gas diffusion layer extends at least partly over the first bypass stopping element, so that the pointed portion of the first bypass stopping element compresses the at least one gas diffusion layer.

3. The fuel cell assembly according to claim 1, wherein the multilayer membrane electrode assembly further comprises at least one subgasket, wherein the at least one subgasket frames the multilayer membrane electrode assembly, wherein the at least one subgasket extends at least partly over the first bypass stopping element, so that the pointed portion of the first bypass stopping element compresses the at least one subgasket.

4. The fuel cell assembly according to claim 1, wherein the at least one sealing element is a bead seal surrounding one of the first flow field plate or the second flow field plate, wherein the bead seal protrudes from the respective base level and is adapted to be directly or indirectly in contact with an other bead seal of an other of the first flow field plate or the second flow field plate for preventing leakage of the reactants to the environment.

5. The fuel cell assembly according to claim 1, wherein in cross-section the blunt portion of the second bypass stopping element is wider than the pointed portion of first bypass stopping element.

6. The fuel cell assembly according to claim 1, wherein at least one of the first bypass stopping element and the second bypass stopping element is a continuous element extending at least along a length of the respective first or second flow field structure, and wherein at least upstream of the respective first or second flow field structure in a direction of reactant flow, the continuous element is connected to the at least one sealing element.

7. The fuel cell assembly according to claim 1, wherein a plurality of discrete bypass stopping elements, are arranged in the boundary area between the respective first flow field structure or second flow field structure and a bead seal of at least one of the first flow field plate and the second flow field plate.

8. The fuel cell assembly according to claim 1, wherein the first bypass stopping element having the pointed portion comprises discrete elements and the second bypass stopping element having the blunt portion is a continuous element extending at least along a length of the second flow field structure, or the first bypass stopping element having the pointed portion is a continuous element extending at least along a length of the first flow field structure and the second bypass stopping element having the blunt portion comprises discrete elements.

9. The fuel cell assembly according to claim 1, wherein at least one bypass stopping element is an integral part of the flow field plate.

10. The fuel cell assembly according to claim 1, wherein at least one of the first bypass stopping element or the second bypass stopping element is a separate bypass stopping element from the respective first or second flow field plate, wherein the separate bypass stopping element is a frame-like element.

11. The fuel cell assembly according to claim 1, wherein the first bypass stopping element with the pointed portion is on an anode side of the fuel cell assembly.

12. A flow field plate for a fuel cell assembly according to claim 1, wherein the flow field plate is the first flow field plate and includes the first bypass stopping element with the pointed portion, which is adapted to compress the multilayer membrane electrode assembly.

* * * * *